United States Patent [19]
Schleif

[11] 3,739,517
[45] June 19, 1973

[54] RETRACTABLE FISH HOOK APPARATUS

[76] Inventor: George H. Schleif, 4030 Chamoune, San Diego, Calif. 92105

[22] Filed: Dec. 6, 1971

[21] Appl. No.: 204,964

[52] U.S. Cl.................................. 43/35, 43/37
[51] Int. Cl............................................ A01k 83/02
[58] Field of Search.................. 43/35, 37, 42.02

[56] References Cited
UNITED STATES PATENTS

| | | | |
|---|---|---|---|
| 1,694,697 | 12/1928 | Beidatsch | 43/35 |
| 2,606,386 | 8/1952 | Seabeck | 43/37 |
| 3,397,477 | 8/1968 | Hand | 43/37 X |

Primary Examiner—Robert Peshock
Assistant Examiner—Daniel J. Leach
Attorney—Carl R. Brown and Neil F. Martin

[57] ABSTRACT

A retractable fish hook apparatus comprising a body with a fish hook pivotally positioned therein. A movable line attached to the body and fish hook and to the fishing line, allows pull on the fishing line in combination with a fish biting the body to move the hook portion of the fish hook outwardly from the body in the direction of movement of the body and into the path of movement through the water. A resilient spring in the body causes the fish hook to hold in the retracted position when moving through the water, but allows the fish hook to move outwardly from the body when a fish bites and holds the body.

4 Claims, 6 Drawing Figures

PATENTED JUN 19 1973 3,739,517

INVENTOR.
GEORGE H. SCHLEIF
BY Brown & Martin
ATTORNEYS

RETRACTABLE FISH HOOK APPARATUS

BACKGROUND OF THE INVENTION

The use of plugs, jigs, spinners and the like in fishing by trolling, casting and in using other known fishing techniques are well known. These types of fishing lures generally have a body portion that floats, bobs, sinks or otherwise is pulled through the water and has hooks suspended therefrom. As is often the case, fishing is done in and around areas that have weeds, logs, rocks and the like through which the hooks, extending from the lure, pass and sometimes engage. This engagement causes possible loss of the line, lure and hooks and causes difficulty.

So it is advantageous to have a fishing lure with means for retaining the hook or hooks within the body of the lure, and which hooks project outwardly in the direction of movement of the body and opposite to the pull on the lure when the lure is taken by the fish. This keeps the fish hooks from contacting weeds, logs, rocks and the like in the normal movement through the water in trolling, and yet makes the hooks available for hooking the fish when the fish takes the lure.

SUMMARY OF THE INVENTION

In an embodiment of this invention, a housing body resembling a fishing plug, lure or the like, and having an elongated shape, has a center rod or line that is movable in the housing body. A fishing line is attached to one end of the rod. Fish hooks held by disk shaped bodies are positioned in a resiliently biased, retracted position in the housing body with the hook end positioned to move through openings in the housing body into a projected position when pulled into this position by movement of the rod or line against the resilient means. When the housing body is pulled through the water by the line, the pulling force is not sufficient to pull the fish hooks from the retracted position to the projected position against the force of the resilient means. However when a fish bites and holds the body, this creates sufficient drag force on the body to overcome the tension of the resilient means, which may be a spring, rotating the hook outwardly through openings in the sides of the body in a radial direction, which hook portion then engages the fish. Thus in normal trolling, the hooks are held in the retracted position and do not engage weeds, logs, rocks and the like. However when the body or lure is taken by the fish, then the hooks move outwardly and engage the fish with the hook portion. The hook or hooks in their outward movement pivot with the hook end forward in the direction of movement of the housing body. Thus the hooks pivot directly into hooking contact with the fish. Should the fish slide rearwardly off the housing body during the biting action, the hook ends even though only slightly projected, will normally hook the fish.

The body portion is made separable providing easy access to the hooks, spring and line. Thus the hooks and disk shaped bodies may be selectively replaced if desired and the springs may be selectively changed in position to set the tension at which the hooks will be rotated from the retracted to the projected position. This allows the body to be used under different environments where the drag on the body may change sufficiently to require adjustment of the tension of the spring in holding the hooks in the retracted position. Also the entire structure can be easily and quickly disassembled and cleaned or otherwise have parts replaced as necessary to keep the entire structure in operating condition.

It is therefore an object of this invention to provide a new and improved retracted fish hook apparatus having a lure body that passes through weeds and around logs and rocks and only projects hooks outwardly when the lure is taken by a fish.

It is another object of this invention to provide a new and improved fishing lure with hooks retractable therein and expandable outwardly to a fish engaging position which has adjustable tension means for setting the tension required to expand the hooks to a projected position.

It is another object of this invention to provide a new and improved fishing lure with hoops retractable therein and with the hook end portions being rotatable outwardly in the direction of movement of the lure.

Other objects and many advantages of this invention will become more apparent upon a reading of the following detailed description and an examination of the drawings, wherein like reference numerals designate like parts throughout and in which.

Figure 1:
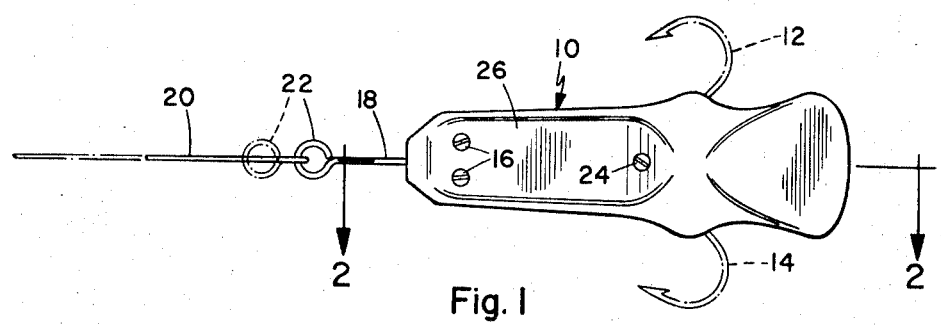
FIG. 1 is a top plan view of the lure.
Figure 2:
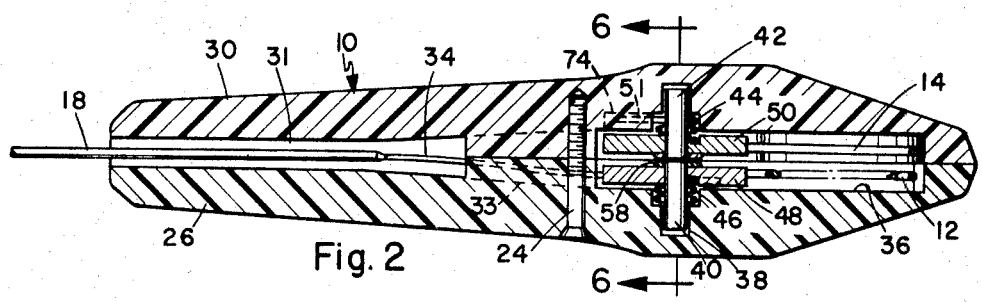
FIG. 2 is an enlarged sectional view taken on line 2—2 of FIG. 1.

Referring now to the drawing, the fish hook apparatus 10 in the illustrative embodiment comprises a housing body portion having a top half 26 and a lower half 30. These body portions are separated into halves and are held together in any suitable manner such as by screws, bolts or the like, 16 and 24 fitting in openings 17, that allow the body portion to be separated providing access to the internal parts in a manner and for purposes that will be described in more detail hereinafter. The composite housing body may have any desired configuration that provides a lure for fishing. Further the housing body 10 may be made out of any suitable material, such as plastic, wood or the like and generally has an elongated shape to provide for the recessing and projecting of the fish hooks 12 and 14 and for being pulled on the end of a fishing line 20.

Figure 3:
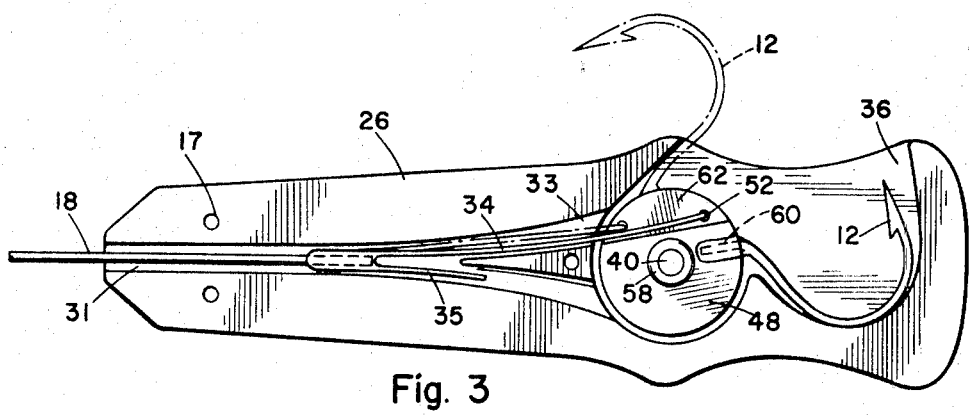
FIG. 3 is an enlarged plan view with the upper body portion removed.

The housing body portion houses the fish hooks 12 and 14 in an enclosed fashion. Each of these fish hooks is mounted in recesses in one of the respective body portions, such as, for example, the fish hook 12 is positioned in a recess 36 in body portion 26 as illustrated in FIG. 3. Each of the fish hooks has a hook portion that is fixed or held by a body such as body 48. The end of the fish hook fits in a recess 60 in the body portion, and may be secured therein by soldering, welding or with adhesives or the like. It may be understood that the hook portion 12 may be selectively replaced by other known fish hooks, by merely cutting off the eye end of the fish hook and bending it to the appropriate shape and then securing the end of the fish hook in the slot 60. The fish hook however is securely held in the slot or recess 60 so as to resist outward pulling force.

Figure 4:
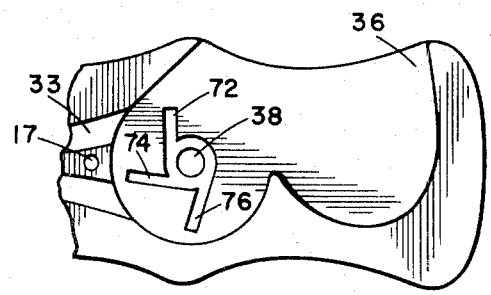
FIG. 4 is a view similar to a portion of FIG. 3, with the hook element removed.
Figure 6:
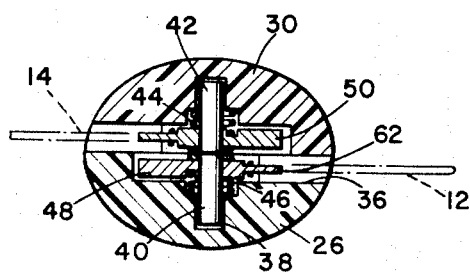
FIG. 6 is a sectional view taken on line 6-6 of FIG. 2.

The body portion 48, which may be made of metal, plastic or any other suitable materials, has an axial portion 40 that projects into, for example, a reset 38 in the housing body portion 26. Thus the body portion 48 may rotate on its axis in the retained position in the housing body 26. A spring 46 is mounted on the axial portion 40 with one end projecting into slot 47 in body 48, and with the other end 51 fitting in slots 72, 74 or 76 in the housing body half 26, see FIG. 4. The end 51 may be selectively set in any of the radially directed slots by merely lifting the body portion 48 and so orienting the spring end 51. It may be understood that the selective positioning of spring end 51 in slots 72 sets the spring tension exerted onto the body 48.

A line 34 is secured to the body portion 48 through opening 52. The line 34 is in turn connected at its end into a rod 18 that projects through channel opening 31. Rod 18 has an eyelet 22 to which the fishing line 20 is secured.

It may be observed, as illustrated in FIG. 3, that upon pulling the fishing line 20, rod 18 is pulled through channel 31 exerting a pulling force on line 34 that passes through channel 33 to exert a rotational pulling force on body 48. When this force exceeds the force of spring 46, then the hook end portion of fish hook 12 is rotated outwardly in the direction of movement of the housing body 10, where the hook portion is capable of hooking a fish.

In the embodiment, the housing body 10 has two hooks 12 and 14, with hook 14 being held by a second body portion 50, having in turn a second axial projection 42 with a second spring 44. The second body portion 50 is similarly connected to a line 35 that is connected to the rod 18 so that line 35 is pulled when rod 18 is pulled, causing the hook portion of hook 14 to be rotated outwardly simultaneously with the outward rotation of hook 12. Spring 44 coacts with similar slots 72, 74 and 76 in the half 30 of the housing body portion 10, so that the spring settings for each of the hooks may be made the same.

Figure 5:
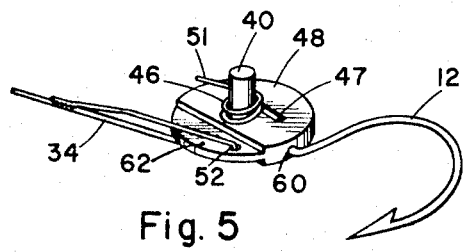
FIG. 5 is a perspective view of a hook element.

In mounting the first and second disk shaped bodies 48 and 50 in the housing body 10, the two body portions are placed in concentric and coaxial abutting relationship, with each of the body portions having a bearing portion 58 that allows rotational movement in opposite directions there-between without having the entire surface of surfaces 48 and 50 sliding against each other. In this close mounting, each of the body portions, as for example, body portion 48, see FIG. 5, has a reduced thickness portion 62. This reduced thickness permits line 34 to move as previously described without being squeezed against the side of the respective halves of the housing body portions.

In operation, the lure or housing body 10 is pulled through the water. This normal movement through the water or through weeds or around logs or rocks or the like does not normally create sufficient drag force on the lure 10 to overcome the force of springs 48 and 44. Thus the hook portions 12 and 14 are not rotated outwardly. However upon a fish taking the lure, the fish in biting the lure creates a drag force that is sufficiently large that it exceeds the force of the respective springs 44 and 48. This causes the hook ends of hooks 12 and 14 to be rotated outwardly, hooking the fish.

It may further be observed that the direct pulling force on the respective body portions causes the hook ends of hooks 12 and 14 to be rotated outwardly in the direction of movement of the body portion. Thus the point ends of the hooks move outwardly so that if the fish were to bite onto the lure and then slide down the length of the lure, the hook points are able to hook the fish even though the hooks were only slightly projected.

Having described my invention, I now claim:

1. A fish hook apparatus for attachment to a fishing line comprising,
    housing body means for being pulled through the water by a fishing line,
    fish hook means positioned in a retracted enclosed position in said housing body means for being moved to a projected position with the hook end projecting from said housing body means into the path of movement of said housing body means,
    operating means for directly pulling said fish hook means and the hook end in the direction of movement of said housing body means from said retracted position to said projected position,
    resilient means for biasing said fish hook means to the retracted position with said resilient means having a given resilient biasing force set to prevent said operating means from moving said fish hook means to said projected position by the drag force of normal movement through the water and allowing said operating means to move said fish hook means to the projected position when a fish bites and holds said housing body means creating a drag force that exceeds the force of said resilient means,
    said housing body means includes a housing body having an elongated configuration with at least one side of said housing body having an opening therein,
    said fish hook means includes at least one fish hook held in said housing body for movement of the hook portion through said opening and to the side of said housing body,
    said fish hook being held by a body which body is pivotally movable in said housing body,
    said operating means including a line for being interconnected between said body and the fishing line,
    said body has a disk shape,
    said line is connected to said body at one side edge of said disk,
    said disk shaped body has axial means for projecting into a recess in said housing body for holding said body for axial rotational movement,
    said resilient means comprises a spiral spring with one end thereof being held by said body and the other end fitting into a slot in said housing body,
    said spiral spring being fitted on said axial means,
    and said housing body has a plurality of spaced slots for selectively receiving said end of said spring and selectively varying the torsional force of said spring.

2. A fish hook apparatus as claimed in claim 1 in which,
    said fish hook means comprising a second fish hook held by a second body with a disk shape and with a second axial means projecting into a second recess in said housing body,
    and said body and said second body are axially positioned in an abutting position with bearing surfaces therebetween.

3. A fish hook apparatus as claimed in claim 2 in which,
    said axial means comprises bar portions extending in opposite axial directions from said body and said second body.

4. A fish hook apparatus as claimed in claim 3 in which,
    said body and said second body having a reduced thickness on the side edge portion to which said line is connected.

* * * * *